(12) United States Patent
Minami et al.

(10) Patent No.: US 7,740,385 B2
(45) Date of Patent: Jun. 22, 2010

(54) PROJECTOR DEVICE

(75) Inventors: Kazuya Minami, Osaka (JP); Masaaki Miyamoto, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 518 days.

(21) Appl. No.: 11/790,954

(22) Filed: Apr. 30, 2007

(65) Prior Publication Data

US 2007/0258249 A1 Nov. 8, 2007

(30) Foreign Application Priority Data

May 2, 2006 (JP) ............................... 2006-128732

(51) Int. Cl.
*B60Q 1/06* (2006.01)
*F21V 29/00* (2006.01)
(52) U.S. Cl. .................. 362/373; 362/294; 362/96; 362/362; 353/57; 353/61
(58) Field of Classification Search ................. 362/373, 362/294, 96, 362; 353/57, 61
See application file for complete search history.

(56) References Cited

U.S. PATENT DOCUMENTS

| 7,345,724 | B2 | 3/2008 | Yoshimura et al. |
| 2005/0134802 | A1 | 6/2005 | Furuta et al. |

FOREIGN PATENT DOCUMENTS

| CN | 1727986 A | 2/2006 |
| JP | 04-53279 U | 5/1992 |
| JP | 10-19795 A | 7/1998 |
| JP | 2005-274730 A | 10/2005 |

OTHER PUBLICATIONS

English Translation of the Japanese Office Action dated May 20 2008, issued in corresponding Japanese patent application No. 2006-128732.
Chinese Office Action dated Jan. 9, 2009, issued in corresponding Chinese Patent Application No. 200710102938.
Office Action dated May 20, 2008, issued in corresponding Japanese Patent Application No. 2006-128732.

*Primary Examiner*—Sandra L O'Shea
*Assistant Examiner*—Jessica L McMillan
(74) *Attorney, Agent, or Firm*—Westerman, Hattori, Daniels & Adrian, LLP

(57) ABSTRACT

A projector device of the present invention includes a light blocking mechanism for blocking leak light from a lamp unit. The light blocking mechanism includes a first light blocking member having a plurality of first light blocking plates arranged therein at certain pitches, and a second light blocking member having a plurality of second light blocking plates arranged therein at certain pitches. The first light blocking plates and the second light blocking plates each define a gap providing an air flow passage. A flat inclined part of each second light blocking plate extends in an inverted direction to a flat inclined part of each first light blocking plate, with a predetermined angle of inclination, so that the first light blocking plates and the second light blocking plates block the light emitted from the lamp unit toward a vent of a casing in all orientations.

5 Claims, 9 Drawing Sheets

PROJECTOR DEVICE

The priority application Number 2006-128732 upon which this patent application is based is hereby incorporated by reference.

BACKGROUND OF THE INVENTION

1. Field of the Invention

The present invention relates to a projector device adapted to guide light from a light source to an optical system to generate images for magnification projection on a forward screen.

2. Description of Related Art

A projector device includes a casing containing an optical unit for generating images and a lamp unit as a light source for the optical unit. The lamp unit is air-cooled by cooling air, because the lamp unit generates heat when it emits light, and will have a shortened life if the temperature of the lamp unit exceeds a critical temperature.

FIG. 15 shows a lamp unit 4 contained in a holder 71. The holder 71 has air vents 72 for exhausting warm air that has cooled the lamp unit 4 inside the holder 71 outside the holder 71. The casing has an exhaust vent for exhausting the warm air exhausted from the inside of the holder 71 outside.

The air vents 72 of the holder 71 and the exhaust vent of the casing are located close to each other in order to quickly exhaust the warm air inside the holder 71 outside. In order to prevent light from the lamp unit 4 from leaking outside from the exhaust vent of the casing through the air vents 72 of the holder 71, conventional projector devices employ light blocking plates 73, as shown in FIG. 13, inclined relative to the opening plane of the air vents 72 of the holder 71 and arranged between the holder 71 and the casing, or, as shown in FIG. 14, a holder having air vents 72 with an inclined inner peripheral surface (see JP 2005-274730, A).

However, the above arrangements cannot block outgoing beams from the lamp unit 4 indicated by dotted arrows in FIG. 13 and FIG. 14, and cannot completely prevent the light of the lamp unit 4 from leaking from the exhaust vent of the casing.

SUMMARY OF THE INVENTION

Accordingly, an object of the present invention is to provide a projector device that ensures that outgoing beams of the lamp unit can be prevented from leaking outside the casing through the vent of the casing.

A projector device of the present invention includes a casing 1 containing a lamp unit 4 and an optical system for generating image light using the lamp unit 4 as a light source to project the generated image light toward a screen, the casing 1 having a wall surface provided with a vent opposed to the lamp unit 4.

The wall surface of the casing 1 opposed to the lamp unit 4 has a light blocking mechanism 9 arranged thereon covering the vent, the light blocking mechanism 9 including a first light blocking member 55 and a second light blocking member 6 arranged close to each other in the vent extending direction.

The first light blocking member 55 has a plurality of first light blocking plates 56 arranged therein at certain pitches and extending in a same direction approximately perpendicular to the vent extending direction, each first light blocking plate 56 defining a gap providing an air flow passage.

The second light blocking member 6 has a plurality of second light blocking plates 64 arranged therein at the same pitches as those of the first light blocking plates 56 and extending in the same direction as the first light blocking plates 56, each second light blocking plate 64 defining a gap providing an air flow passage. Each first light blocking plate 56 includes a flat inclined part having a predetermined angle of inclination relative to the wall surface, while each second light blocking plate 64 includes a flat inclined part having a predetermined angle of inclination relative to the wall surface and extending in an inverted direction to the inclined part of each first light blocking plate 56. The first light blocking plates 56 and the second light blocking plates 64 are arranged to provide a predetermined phase difference therebetween, so that the light blocking mechanism 9 blocks the light emitted from the lamp unit 4 toward the vent in all orientations.

Specifically, the first light blocking plates 56 and the second light blocking plates 64 are each formed to have a length across the vent provided in the wall surface. The first light blocking plates 56 and the second light blocking plates 64 each include a flat parallel part extending from the corresponding inclined part and approximately parallel with the wall surface.

More specifically, the first light blocking member 55 is provided on a holder 5 containing the lamp unit 4, the holder 5 including a side wall 53 in the form of a frame having a central opening, the first light blocking plates 56 extending across the central opening of the side wall 53, the second light blocking member 6 being held within a central opening 63 of a frame 60, the second light blocking plates 64 extending across the central opening 63 of the frame 60.

Furthermore specifically, the first light blocking plates 56 each have side wall parts 59, 59 formed at opposite longitudinal ends thereof and projecting approximately perpendicularly from opposite end edges of the corresponding inclined part to the side wall 53 of the holder 5, and the second light blocking plates 64 each have side wall parts 67, 67 formed at opposite longitudinal ends thereof and projecting approximately perpendicularly from opposite end edges of the corresponding inclined part to the frame 60. This prevents the light from leaking from the opposite longitudinal ends of the first light blocking plates 56 and the second light blocking plates 64.

As described above, the projector device of the present invention ensures that outgoing beams from the lamp unit can be prevented from leaking outside through the exhaust vent of the casing.

DETAILED DESCRIPTION OF THE INVENTION

Figure 1:
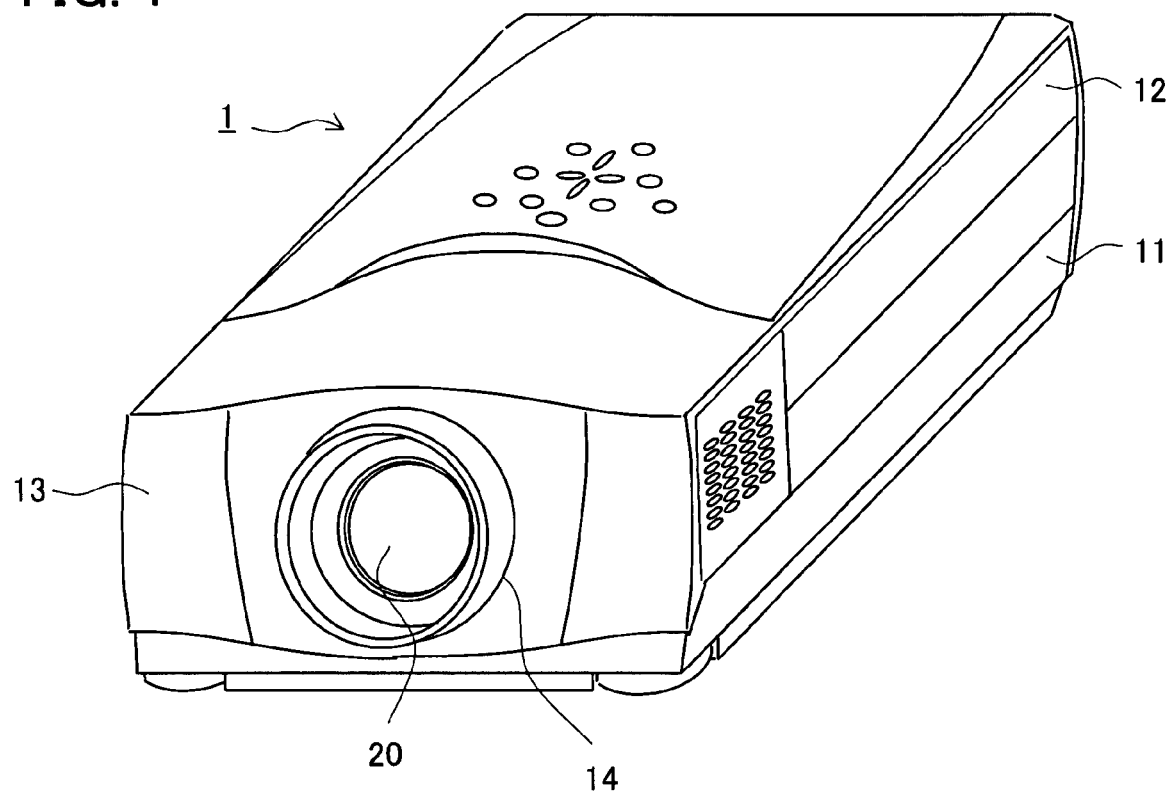
FIG. 1 is a perspective view showing a liquid crystal projector device of the present invention as a whole.
Figure 2:
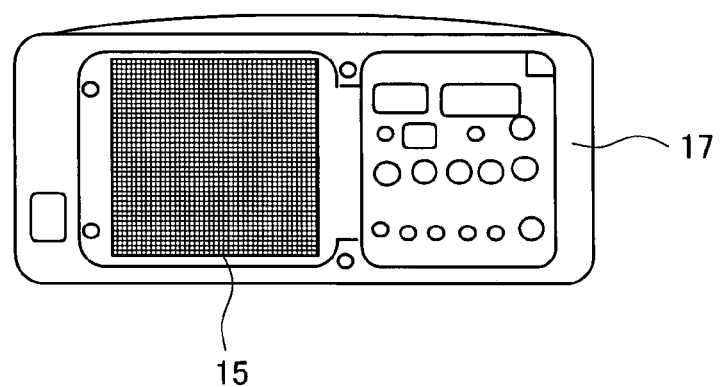
FIG. 2 is a back view of the liquid crystal projector device shown in FIG. 1.

The present invention embodied in a liquid crystal projector device will be specifically described below with reference to the drawings. As shown in FIG. 1, the liquid crystal projector includes a flat casing 1 including a lower half case 11 and an upper half case 12. The casing 1 has a front panel 13 provided with a projection window 14. As shown in FIG. 2, a vent used as an exhaust vent 15 is provided in a rear panel 17.

Figure 3:
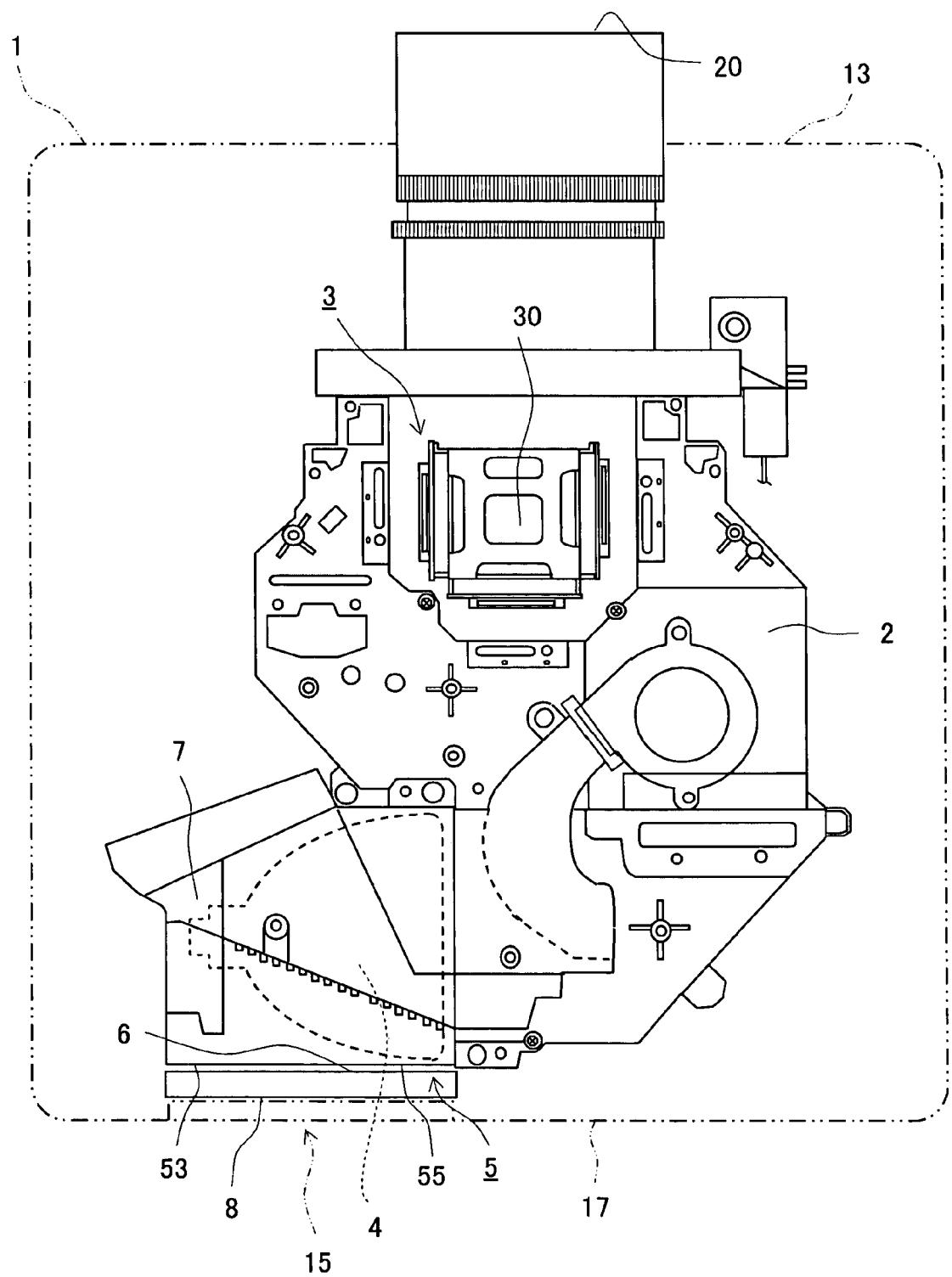
FIG. 3 is a plan view showing an arrangement of a lamp unit and an optical unit mounted in the liquid crystal projector.

Included inside the casing 1 are, as shown in FIG. 3, an optical unit 2 for generating color image light, and a lamp unit 4 providing a light source for the optical unit 2. The lamp unit 4 is contained in an outer holder 7.

Optical Unit

Figure 4:
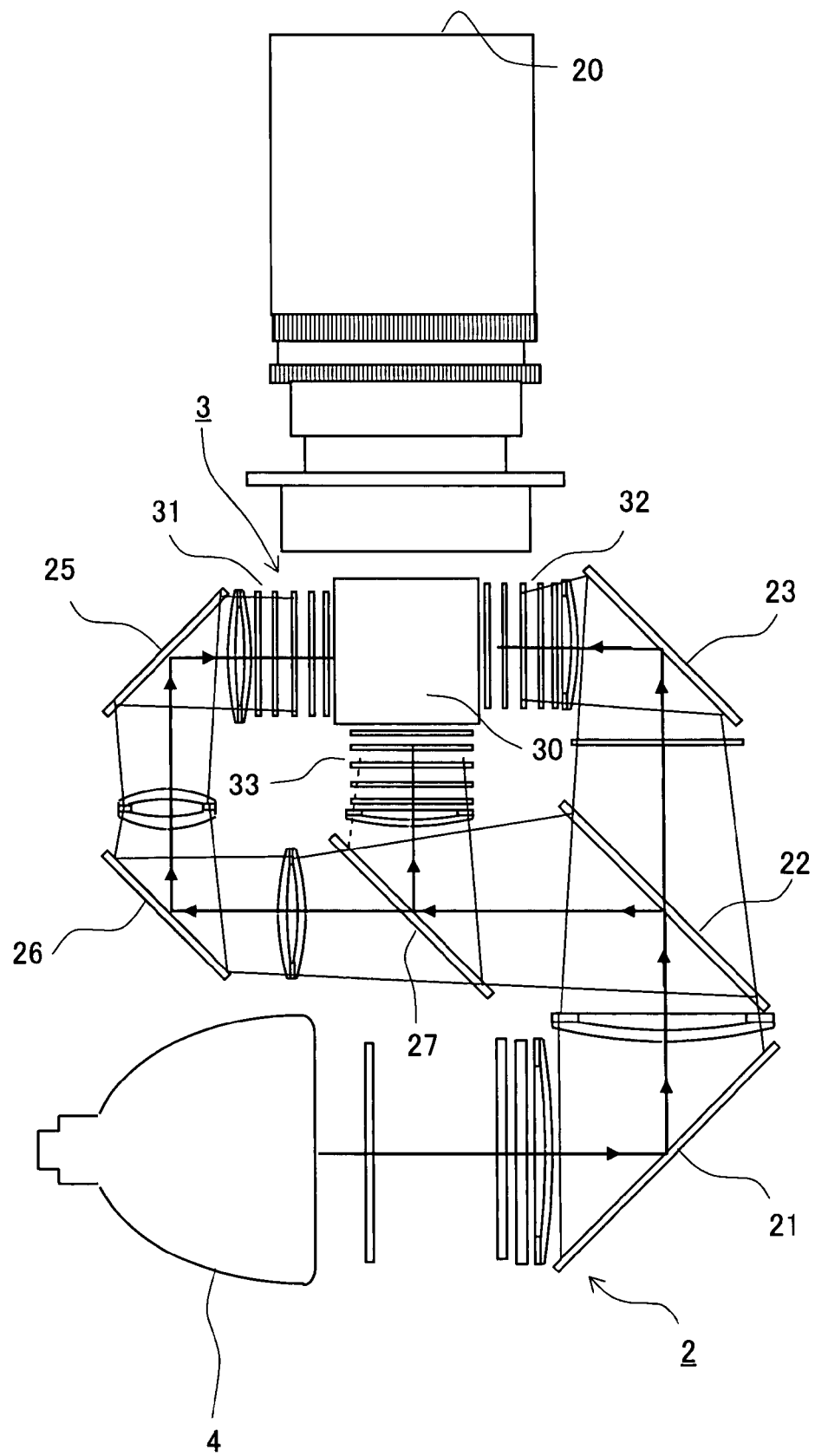
FIG. 4 is a plan view showing an optical system of the lamp unit and the optical unit mounted in the liquid crystal projector.

As shown in FIG. 4, in the optical unit 2, white light from the lamp unit 4 falls on a first field mirror 21, and is reflected by the first field mirror 21 to fall on a first dichroic mirror 22. The first dichroic mirror 22 reflects red light and green light, so that only blue light passes through the first dichroic mirror 22. The blue light that has passed through the first dichroic mirror 22 falls on a second field mirror 23, and is reflected by the second field mirror 23 to enter a color synthesizer 3.

The red and green light reflected by the first dichroic mirror 22 falls on a second dichroic mirror 27. The second dichroic mirror 27 reflects the green light. The green light reflected by the second dichroic mirror 27 enters the color synthesizer 3.

The red light incident on the second dichroic mirror 27 passes through the second dichroic mirror 27, and is reflected by a third field mirror 26 and a fourth field mirror 25 to enter the color synthesizer 3.

Color Synthesizer

The color synthesizer 3 includes a color synthesis prism 30, a red image generating unit 31, a green image generating unit 33 and a blue image generating unit 32. The red image generating unit 31, green image generating unit 33 and blue image generating unit 32 each include an outgoing side polarizing plate, a liquid crystal panel and an incidence side polarizing plate arranged sequentially from the color synthesis prism 30.

The red light, green light and blue light that have entered the color synthesizer 3 pass through the red image generating unit 31, green image generating unit 33 and blue image generating unit 32, respectively, and enter the color synthesis prism 30.

The image light of the three colors guided to the color synthesis prism 30 is synthesized by the color synthesis prism 30, and the resulting color image light is magnifyingly projected through a projection lens 20 onto a forward screen.

Lamp Unit

Figure 5:
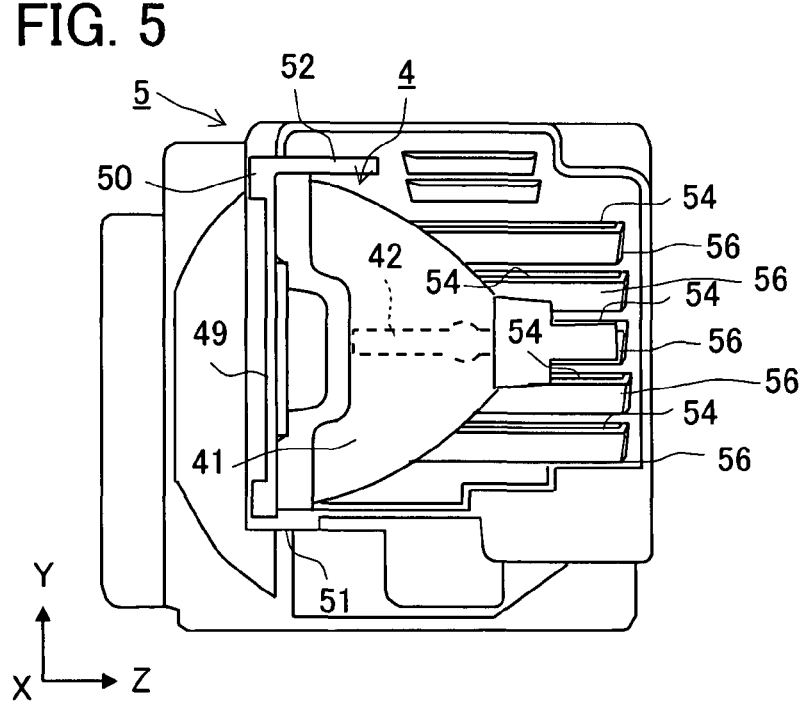
FIG. 5 is a side view of the lamp unit contained in an inner holder.
Figure 6:
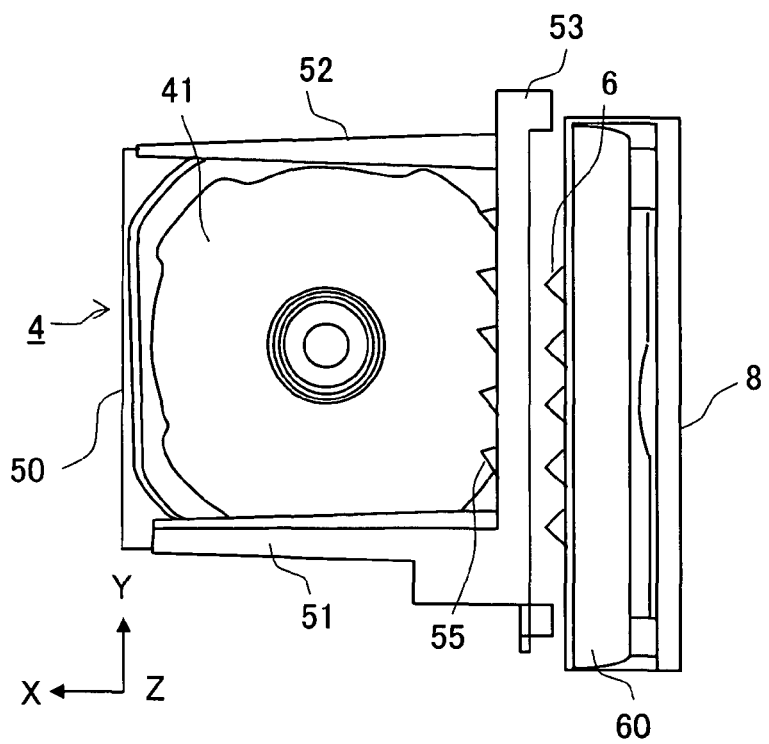
FIG. 6 is a back view of the lamp unit contained in the inner holder.

As shown in FIG. 3, the outer holder 7 containing the lamp unit 4 is located close to the exhaust vent provided in the rear panel 17 of the casing 1. As shown in FIG. 5 and FIG. 6, the outer holder 7 contains the lamp unit 4 held by an inner holder 5. The lamp unit 4 has a light emitting tube 42 and a parabolic reflector 41 surrounding the light emitting tube 42. A discharge emission lamp such as a metal halide lamp or an extra-high pressure mercury lamp, for example, may be used as the lamp unit 4.

Figure 9:
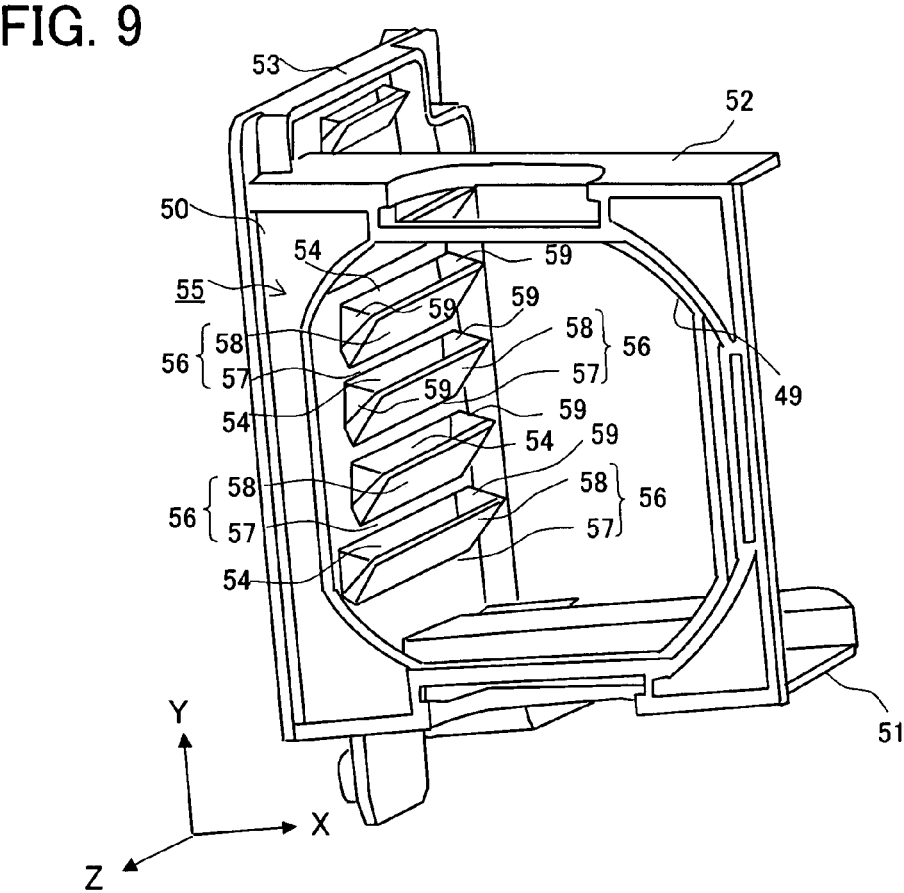
FIG. 9 is a perspective view of the inner holder.

As shown in FIG. 9, the inner holder 5 includes a front wall 50 with a rectangular outline, a first side wall 51, a second side wall 52 and a third side wall 53 approximately perpendicular to the front wall 50. As shown in FIG. 5, the front wall 50 of the inner holder 5 is located in an outgoing direction of light of the lamp unit 4. The front wall 50 is provided with a light outgoing hole 49 for passing the light from the lamp unit 4.

Figure 7:
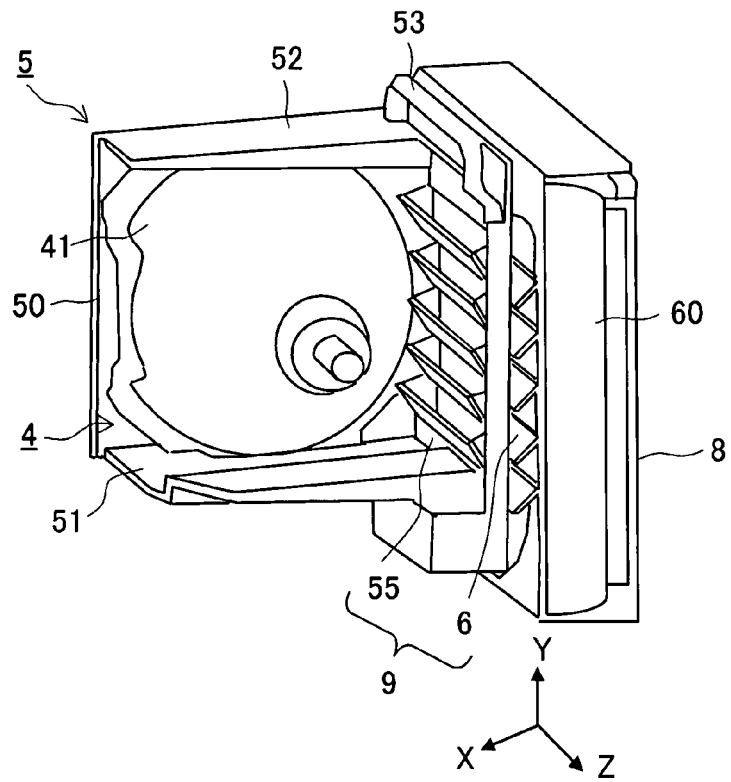
FIG. 7 is a perspective view showing the lamp unit, the inner holder, a light blocking member and an exhaust fan device as a whole.

As shown in FIG. 7, the first side wall 51, second side wall 52 and third side wall 53 of the inner holder 5 surround the side of the reflector 41 of the lamp unit 4. The third side wall 53 of the inner holder 5 is located between the lamp unit 4 and the exhaust vent 15 of the casing 1, and opposed to the rear panel 17 provided with the exhaust vent 15 of the casing 1.

As shown in FIG. 9, the third side wall 53 of the inner holder 5 is formed in the form of a frame with a central opening. A first light blocking member 55 is formed in the central opening. The first light blocking member 55 is provided with a plurality of (five, in the example of FIG. 9) holder air vents 54. The extending direction (X-direction) of the holder air vents 54 is approximately parallel with the extending direction of the exhaust vent 15 of the casing 1. Each holder air vent 54 provides an air flow passage between the inside of the inner holder 5 and the exhaust vent 15 of the casing 1. The opening plane (Y-Z plane) of the holder air vents 54 is parallel to the rear panel 17 provided with the exhaust vent 15 of the casing 1.

Each holder air vent 54 is formed in the form of a wide rectangle. The width of the holder air vents 54 extends in the direction (Z-direction) perpendicular to the front wall 50 of the lamp unit 4. In addition, the width of the holder air vents 54 is defined to have a length across the exhaust vent 15 of the casing 1. The plurality of holder air vents 54 are adjacently provided at approximately regular intervals in the direction (Y-direction) approximately perpendicular to the width direction (Z-direction) of the holder air vents 54.

Further, the first light blocking member 55 is provided with a plurality of (five, in the example of FIG. 9) first light blocking plates 56. The first light blocking plates 56 have a parallel part 57 approximately parallel with the opening plane (Y-Z plane) of the holder air vents 54 between adjacent holder air vents 54, 54, or between a holder air vent 54 and the first side wall 51 of the inner holder 5. The parallel part 57 of each first light blocking plate 56 is formed across in the width direction (Z-direction) of the holder air vents 54.

Each first light blocking plate 56 includes a flat rectangular inclined part 58 projecting from the corresponding parallel part 57 inward of the inner holder 5. The projecting direction of the inclined part 58 of each first light blocking plate 56 is inclined from the opening plane (Y-Z plane) of the holder air vents 54 with a predetermined angle. The inclined parts 58 have a constant dimension (width dimension) in the direction perpendicular to the projecting direction.

Each holder air vent 54 is covered with the inclined part 58 of the corresponding first light blocking plate 56 inside the inner holder 5. The distance between the opening plane (Y-Z plane) of the holder air vents 54 and the inclined part 58 of each first light blocking plate 56 becomes large from one end toward the other end in the direction (Y-direction) perpendicular to the width direction (Z-direction) of the holder air vents 54.

A pair of side wall parts 59, 59 are provided on both sides in the width direction (Z-direction) of the holder air vents 54, and perpendicularly project from the outer periphery of each holder air vent 54 inward of the inner holder 5. Projecting ends of the pair of side wall parts 59, 59 are coupled to opposite ends in the width direction of the corresponding first light blocking plate 56.

The third side wall 53 of the inner holder 5 is exposed from the outer holder 7. As shown in FIG. 3, a second light blocking member 6 is located between the first light blocking member 55 formed in the third side wall 53 of the inner holder 5 and the rear panel 17 provided with the exhaust vent 15 of the casing 1.

Figure 12:
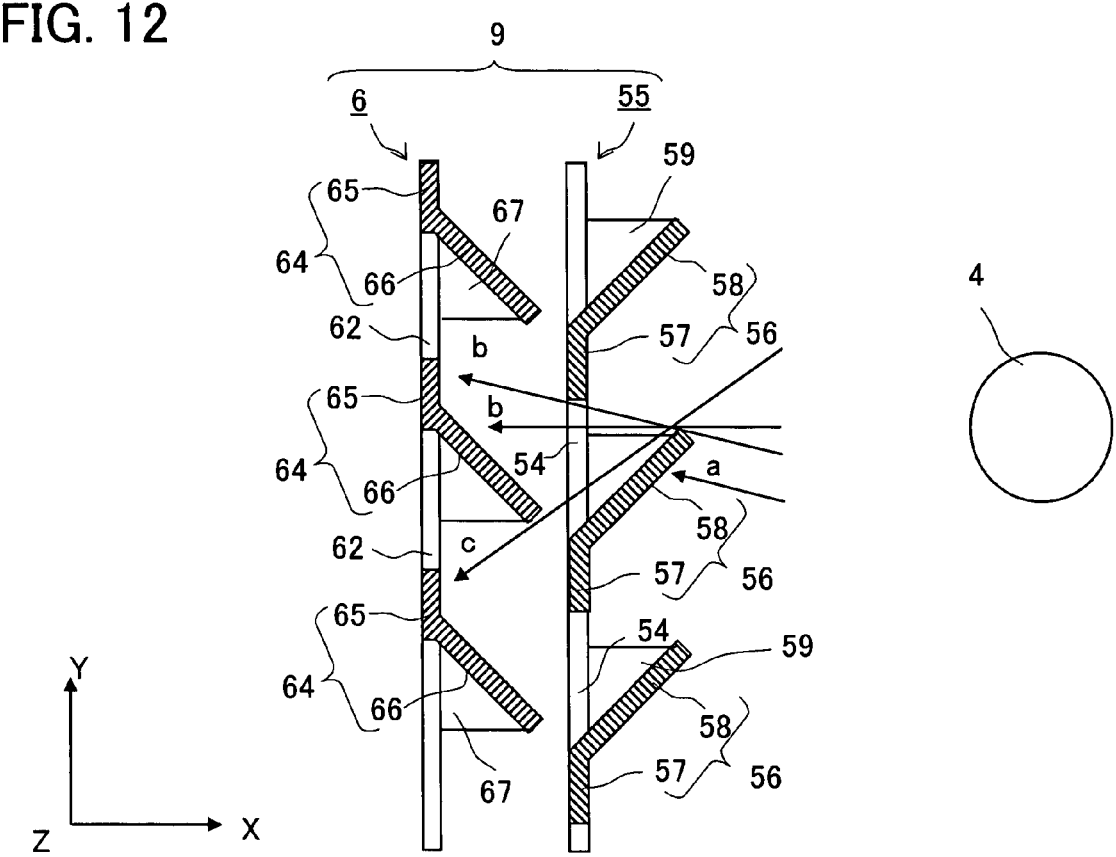
FIG. 12 illustrates light paths in the light blocking mechanism.
Figure 13:
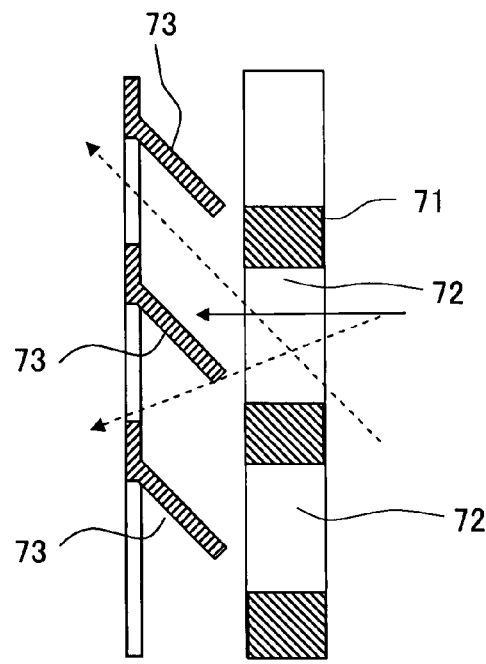
FIG. 13 illustrates light paths of a conventional liquid crystal projector device from the inside of a holder toward the outside of a casing.
Figure 14:
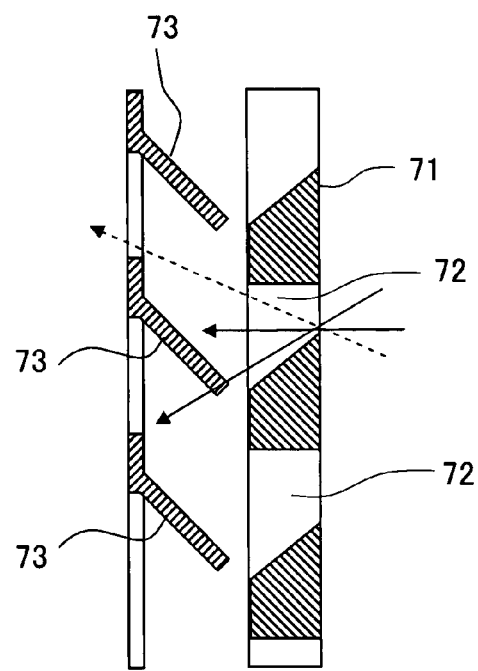
FIG. 14 illustrates light paths in another conventional liquid crystal projector device from the inside of a holder toward the outside of a casing.
Figure 15:
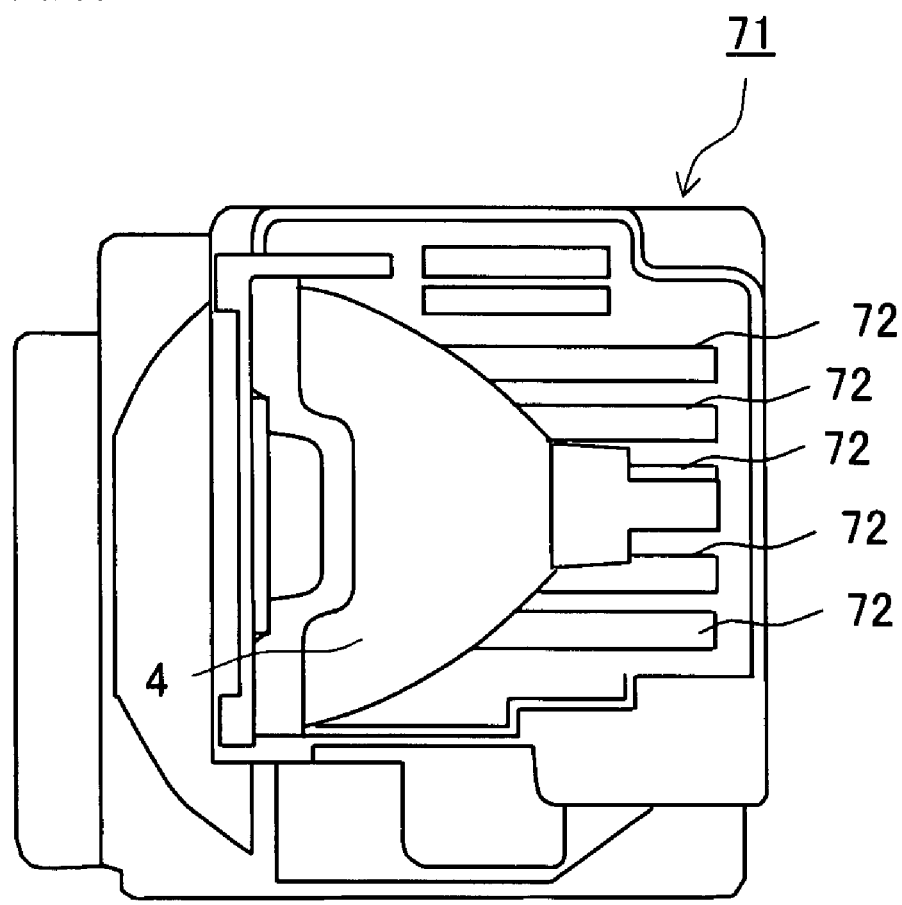
FIG. 15 is a side view of a lamp unit contained in a holder in still another conventional liquid crystal projector device.

As shown in FIG. 12, the first light blocking member 55 and the second light blocking member 6 are arranged adjacently to each other in the extending direction (X-direction) of the holder air vents 54 of the first light blocking member 55, so that the first light blocking member 55 and the second light blocking member 6 provide a light blocking mechanism 9.

Figure 10:
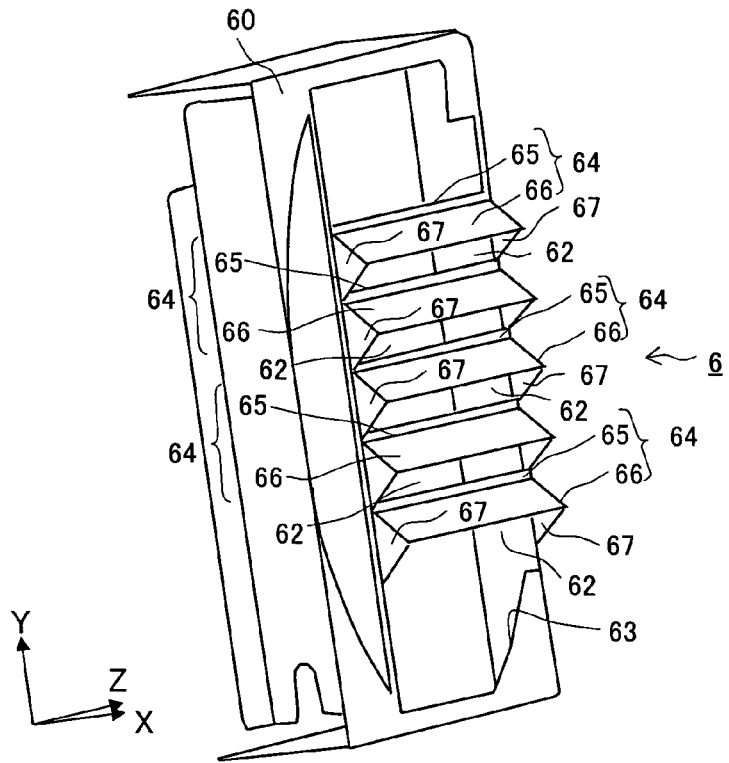
FIG. 10 is a perspective view of the light blocking member.

The second light blocking member 6 is made of a metal plate, and, as shown in FIG. 10, held inside a frame 60 having a central opening 63. The second light blocking member 6 is provided with a plurality of (five, in the example of FIG. 10) intermediate air vents 62. The extending direction (X-direction) of the intermediate air vents 62 is arranged in parallel with the extending direction (X-direction) of the holder air vents 54. Each intermediate air vent 62 provides an air flow passage between the corresponding holder air vent 54 and the exhaust vent 15 of the casing 1.

Each intermediate air vent 62 is formed in the form of a wide rectangle. The width of the intermediate air vents 62 is defined to have a length across the exhaust vent 15 of the casing 1. The plurality of intermediate air vents 62 are adjacently provided in the direction (Y-direction) approximately perpendicular to the width direction (Z-direction) of the intermediate air vents 62. As shown in FIG. 12, the juxtaposition direction of the plurality of intermediate air vents 62 is parallel with the juxtaposition direction (Y-direction) of the plurality of holder air vents 54. The juxtaposition distance of the plurality of intermediate air vents 62 is approximately the same as the juxtaposition distance of the plurality of holder air vents 54. In the light blocking member 6 shown in FIG. 10, an intermediate air vent 62 located at one side in the juxtaposition direction (Y-direction) of the plurality of intermediate air vents 62 is coupled to the central opening 63 of the frame 60.

The second light blocking member 6 is provided with a plurality of (five, in the example of FIG. 10) second light blocking plates 64. The second light blocking plates 64 have a parallel part 65 approximately parallel with the opening plane (Y-Z plane) of the intermediate air vents 62 between adjacent intermediate air vents 62, 62, or between an intermediate air vent 62 and the frame 60 of the light blocking member 6. The parallel part 65 of each second light blocking plate 64 is formed across in the width direction (Z-direction) of the intermediate air vents 62.

As shown in FIG. 12, the parallel part 65 of each second light blocking plate 64 is arranged approximately parallel with the parallel part 57 of each first light blocking plate 56. The parallel parts 65 of the plurality of second light blocking plates 64 are adjacently provided at intervals approximately the same as those of the parallel parts 57 of the plurality of first light blocking plates 56.

Each second light blocking plate 64 includes a flat rectangular inclined part 66 projecting from the corresponding parallel part 65 toward the first light blocking member 55. The inclined part 66 of each second light blocking plate 64 is inclined from the opening plane (Y-Z plane) of the intermediate air vents 62 with a predetermined angle, and in a direction approximately perpendicular to the direction in which the inclined part 58 of each first light blocking plate 56 extends from the corresponding parallel part 57.

The inclined parts 66 have a constant dimension (width dimension) in the direction perpendicular to the projecting direction. Each second light blocking plate 64 covers the corresponding intermediate air vent 62, and also covers the corresponding holder air vent 54. Opposite ends in the direction perpendicular to the projecting direction of each second light blocking plate 64 are coupled to a pair of side wall parts 67, 67 projecting from both sides in the width direction (Z-direction) of each intermediate air vent 62.

The parallel part 57 of each first light blocking plate 56 and the parallel part 65 of each second light blocking plate 64 are arranged to provide a phase difference therebetween so as to only partly overlap in the disposition direction (X-direction) of the first light blocking member 55 and the second light blocking member 6. Projecting ends of inclined parts 66, 66 of adjacent second light blocking plates 64, 64 are arranged close to parallel parts 57, 57 of adjacent first light blocking plates 56, 56.

In such a light blocking mechanism 9, each holder air vent 54 is covered with the corresponding first light blocking plate 56 on the side close to the lamp unit 4, and also covered with the corresponding second light blocking plate 64 on the side close to the second light blocking member 6. Each holder air vent 54 is located between inclined parts 66, 66 of adjacent second light blocking plates 64, 64.

As shown in FIG. 3, an exhaust fan device 8 for sucking out the air in the inner holder 5 for exhaust to the outside from the exhaust vent 15 of the casing 1 is arranged between the light blocking member 6 and the rear panel 17 provided with the exhaust vent 15 of the casing 1.

Figure 8:
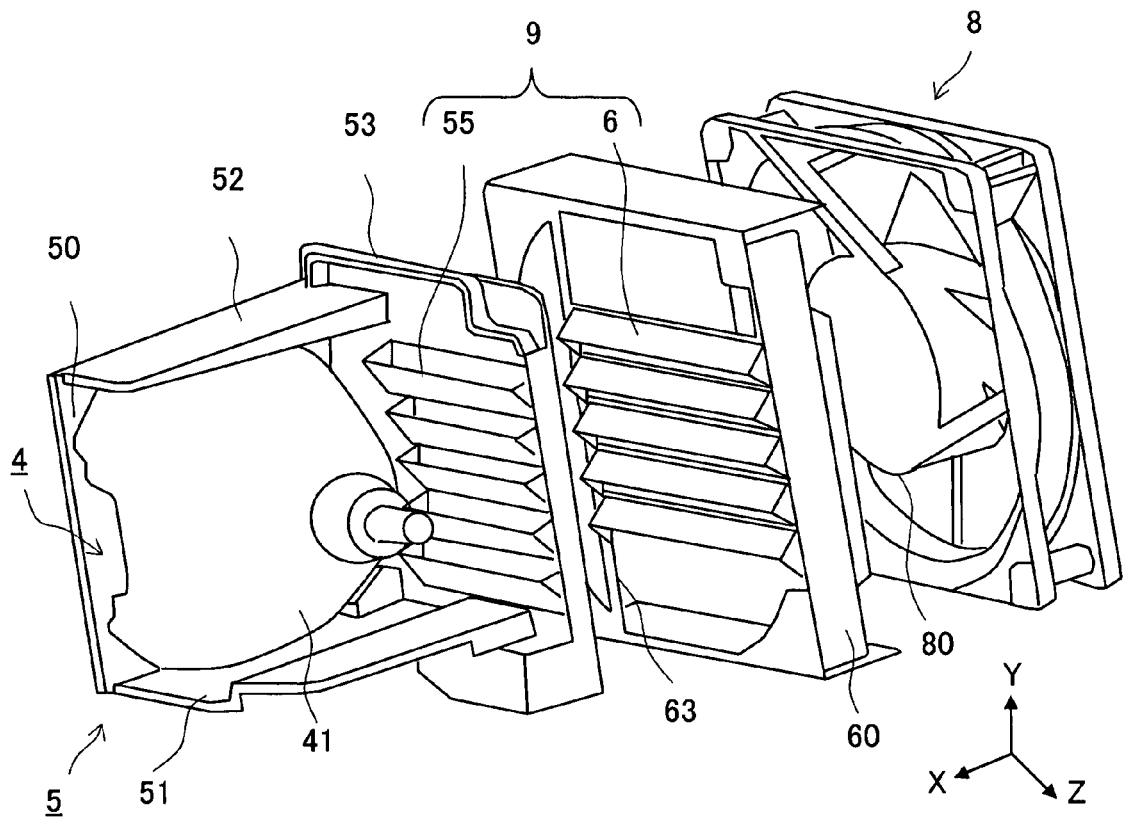
FIG. 8 is an exploded perspective view of the lamp unit, inner holder, light blocking member and exhaust fan device.

Because the lamp unit 4 generates heat when it emits light, airflow is sent into the inner holder 5 from a cooling fan device (not shown), so that the lamp unit 4 is cooled by the airflow. The air that has cooled the lamp unit 4 is heated, and therefore an exhaust fan 80 of the exhaust fan device 8 as shown in FIG. 8 is rotated to thereby suck out the air in the inner holder 5 toward the exhaust fan device 8.

The plurality of holder air vents 54 and the plurality of intermediate air vents 62 providing air flow passages, as shown in FIG. 12, are provided between the inside of the inner holder 5 and the exhaust fan device 8. Although the holder air vents 54 are covered with the respective first light blocking plates 56, the air in the inner holder 5 can pass through the holder air vents 54 without being blocked by the first light blocking plates 56, because the first light blocking plates 56 are inclined relative to the opening plane of the holder air vents 54, and cover the holder air vents 54 without closing the holder air vents 54.

Although the holder air vents 54 are covered also with the respective second light blocking plates 64, the air that has passed through the holder air vents 54 flows to the intermediate air vents 62 without being blocked by the second light blocking plates 64 because each holder air vent 54 is located between inclined parts 66 of adjacent second light blocking plates 64, 64.

Further, although the intermediate air vents 62 are covered with the respective second light blocking plates 64, the air that has passed through the holder air vents 54 can pass through the intermediate air vents 62 without being blocked by the second light blocking plates 64, because the second light blocking plates 64 are inclined relative to the opening plane of the intermediate air vents 62, and cover the intermediate air vents 62 without closing the intermediate air vents 62.

This secures exhaust paths necessary for exhausting the air in the inner holder 5 outside, and eliminates the necessity to speed up the rotation of the exhaust fan 80 even though the first and second light blocking plates 56, 64 are provided. This can suppress noise due to the rotation of the exhaust fan 80.

Figure 11:
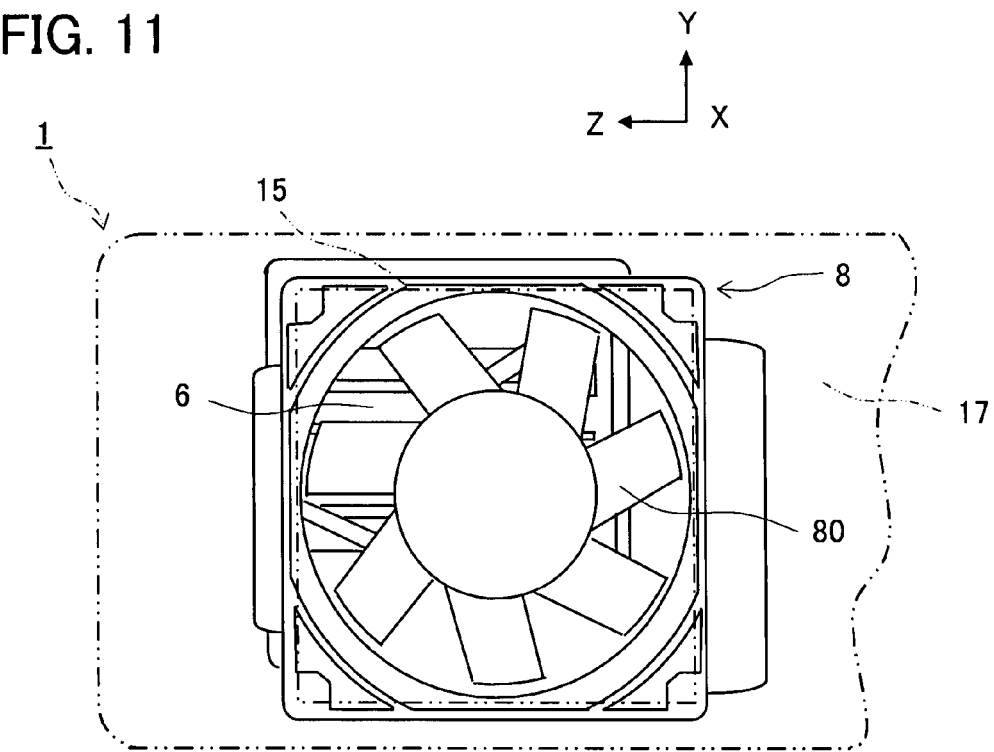
FIG. 11 is a back view of the exhaust fan device.

As shown in FIG. 11, the second light blocking member 6 of the light blocking mechanism 9 is exposed from the exhaust vent 15 of the casing 1 via the exhaust fan device 8. As shown in FIG. 8, the lamp unit 4 is located inside the second light blocking member 6, but the second light blocking member 6 will not leak outgoing beams of the lamp unit 4.

FIG. 12 shows the light blocking mechanism 9 blocking outgoing beams of the lamp unit 4. As illustrated, the light blocking mechanism 9 blocks beams (arrows a, b, c in the drawing) that have been emitted from the lamp unit 4 and travel in directions within the X-Y plane, and therefore the outgoing beams of the lamp unit 4 will not leak. The light blocking mechanism 9 also blocks beams traveling in the Z-direction with the pair of side wall parts 59, 59 provided on both sides of each holder air vent 54 and pair of side wall parts 67, 67 provided on both sides of each intermediate air vent 62. Therefore, the outgoing beams of the lamp unit 4 will not leak from the light blocking mechanism 9 in any direction.

The present invention is not limited to the foregoing embodiment in construction but can be modified variously by one skilled in the art without departing from the spirit of the invention as set forth in the appended claims. For example, there may be any number of holder air vents 54 and intermediate air vents 62 and any number of first light blocking plates 56 and second light blocking plates 64. The first light blocking plates 56 may project toward the second light blocking member 6, and the second light blocking plates 64 may project toward the exhaust vent 15 of the casing 1.

Although the above embodiment utilizes the holder air vents 54 and intermediate air vents 62 as exhaust vents for exhausting the air in the inner holder 5, the holder air vents 54 and intermediate air vents 62 are usable as intake air vents for taking in outside air. In this case, the vent of the casing 1 used as the exhaust vent 15 of the casing 1 in the above embodiment will be utilized as an intake air vent. The exhaust fan device 8 may be omitted.

What is claimed is:

1. A projector device, comprising:
    a lamp unit;
    an optical system for generating image light using the lamp unit as a light source to project the generated image light toward a screen;
    a casing containing the lamp unit and the optical system, the casing having a wall surface provided with a vent opposed to the lamp unit, the wall surface of the casing opposed to the lamp unit having a light blocking mechanism arranged thereon covering the vent, the light blocking mechanism comprising
    a first light blocking member, the first light blocking member including a plurality of first light blocking plates arranged therein at certain pitches and extending in a same direction approximately perpendicular to a vent extending direction, each first light blocking plate comprising a flat inclined part having a predetermined angle of inclination relative to the wall surface, each first light blocking plate defining a gap providing an air flow passage;
    a second light blocking member arranged close to the first light blocking member in the vent extending direction, the second light blocking member having a plurality of second light blocking plates arranged therein at the same pitches as those of the first light blocking plates and extending in the same direction as the first light blocking plates, each second light blocking plate comprising a flat inclined part having a predetermined angle of inclination relative to the wall surface and extending in an inverted direction to the inclined part of each first light blocking plate, each second light blocking plate defining a gap providing an air flow passage,
    wherein the first light blocking plates and the second light blocking plates are arranged to provide a predetermined phase difference therebetween, so that the light blocking mechanism blocks the light emitted from the lamp unit toward the vent in all orientations.

2. The projector device according to claim 1, wherein the first light blocking plates and the second light blocking plates are each formed to have a length across the vent provided in the wall surface.

3. The projector device according to claim 1, wherein the first light blocking plates and the second light blocking plates 64 each comprise a flat parallel part extending from the corresponding inclined part and approximately parallel with the wall surface.

4. The projector device according to claim 1, wherein the first light blocking member is provided on a holder containing the lamp unit, the holder 5 comprising a side wall in the form of a frame having a central opening, the first light blocking plates extending across the central opening of the side wall, the second light blocking member being held within a central opening of a frame, the second light blocking plates extending across the central opening of the frame.

5. The projector device according to claim 4, wherein the first light blocking plates each have side wall parts formed at opposite longitudinal ends thereof and projecting approximately perpendicularly from opposite end edges of the corresponding inclined part to the side wall of the holder, and the second light blocking plates each have side wall parts formed at opposite longitudinal ends thereof and projecting approximately perpendicularly from opposite end edges of the corresponding inclined part to the frame.

* * * * *